United States Patent Office 3,701,630
Patented Oct. 31, 1972

3,701,630
PROCESS IMPROVEMENT IN SYNTHESIS OF OXYCHLORINE TRIFLUORIDE
Charles B. Lindahl, Woodland Hills, Carl J. Schack, Chatsworth, and Donald Pilipovich, Agoura, Calif., assignors to North American Rockwell Corporation
No Drawing. Filed Feb. 9, 1970, Ser. No. 14,820
Int. Cl. C01b 7/24, 11/02, 11/24
U.S. Cl. 23—203                                  10 Claims

ABSTRACT OF THE DISCLOSURE

In a process for preparing oxychlorine trifluoride by the reaction of chlorine nitrate and fluorine, the improvement wherein the reaction is initiated in the presence of a covalent fluoride which is capable of oxidizing chlorine nitrate. Oxychlorine trifluoride is useful as an oxidizer.

---

The invention herein described was made in the course of or under a contract with the Department of the Navy.

CROSS REFERENCE TO RELATED APPLICATIONS

This application is related to applications Ser. Nos. 543,493 and 551,490 filed Apr. 13, 1966 and May 13, 1966, respectively.

BACKGROUND OF THE INVENTION

Oxychlorine trifluoride ($ClF_3O$) is a known oxidizer which is described in application Ser. No. 543,493. The preparation of oxychlorine trifluoride (also known as chlorine trifluoride oxide or chlorine oxytrifluoride) by the reaction of chlorine nitrate and fluorine is described in application Ser. No. 551,490. Oxychlorine trifluoride can be prepared by the fluorination of chlorine nitrate either in the presence or in the absence of an alkali metal fluoride such as cesium fluoride. The fluorination of chlorine nitrate is usually conducted below ambient temperature. The low temperature fluorination of chlorine nitrate is a convenient method for preparing oxychlorine trifluoride. This process, however, has been found to proceed with a long induction period followed by a rapid highly exothermic reaction. The presence of the induction period effectively eliminates the use of a flow process while the rapid following reaction sometimes leads to uncontrolled reaction.

Accordingly, an object of the present invention is the elimination or substantial reduction of the induction period in the fluorination of chlorine nitrate and the prevention of rapid highly exothermic reactions.

Further objects will become apparent upon reading the undergoing specification and claims.

SUMMARY OF THE INVENTION

In a process for preparing oxychlorine trifluoride by the reaction of chlorine nitrate and fluorine, the improvement wherein the induction period for this reaction is substantially reduced by initiating the reaction in the presence of a covalent fluoride which is capable of oxidizing chlorine nitrate.

DESCRIPTION OF THE INVENTION

A process is provided for preparing oxychlorine trifluoride by the low temperature fluorination of chlorine nitrate wherein the induction time for the start of the reaction is substantially reduced by initiating the reaction in the presence of a covalent fluoride which is capable of oxidizing chlorine nitrate. The induction period will be defined herein as the time required to obtain 20 percent reaction or, in other words, the time required to obtain 20 percent of the theoretical yield of oxychlorine trifluoride. The covalent fluoride which is capable of oxidizing chlorine nitrate may be a fluoride of a Group VII-A element, a fluoride of xenon or a fluoride of a Group VI-B, Group VII-B or Group VIII element which is in its maximum valence state. Illustrative fluorides of Group VII-A elements are chlorine monofluoride; chlorine or bromine trifluoride; chlorine, bromine or iodine pentafluoride; iodine heptafluoride; oxychlorine trifluoride; iodine oxypentafluoride; chloryl fluoride and perchloryl fluoride. Illustrative fluorides of xenon are xenon difluoride and xenon tetrafluoride. Tungsten hexafluoride is an example of a fluoride of a Group VI-B element in its maximum valence state. Rhenium hexafluoride is an example of a fluoride of a Group VII-B element in its maximum valence state. Examples of usable fluorides of Group VIII elements in their maximum valence state are osmium octafluoride, platinum hexafluoride and iridium hexafluoride. The oxyfluorides of Group VI-B, Group VII-B and Group VIII elements in their maximum valence states may also be employed.

The fluorination of chlorine nitrate should be conducted at a temperature below 100° C. The preferred temperature range is from ambient to —23° C. The reaction should be conducted at a pressure above 14.7 p.s.i. and pressures substantially above 60 or 100 p.s.i. are preferred. Depending upon the equipment employed, the reaction can conveniently be conducted at pressures up to 1000 p.s.i. The ultimate completion of the reaction can be determined by observing a decrease of pressure in the reactor.

The preferred initiator is chlorine trifluoride. Chlorine trifluoride serves as an effective initiator in a mole ratio of fluorine trifluoride to chlorine nitrate as low as 0.02. Mole ratios from 0.05 to 0.10 are preferred. Another preferred initiator is chloryl fluoride. Chlorine monofluoride, while not as effective an initiator as chlorine trifluoride or chloryl fluoride, can adequately be employed in mole ratios of 0.10 to 0.15 chlorine monofluoride to chlorine nitrate.

The following non-limitative examples illustrate the invention:

Example 1

An apparatus consisting of a 95-milliliter Monel cylinder and a stainless steel valve was assembled with a high pressure fitting which was brazed. A small cross-T manifold assembly which permitted the evacuation of the cylinder to a vacuum of $10^{-4}$ torr, the charging of the cylinder with gaseous fluorine and gaseous covalent flouride and the rapid injection of liquid chlorine nitrate was affixed to the cylinder valve. Using 9 mmoles of chlorine trifluoride and 3 liters of fluorine (previously charged to the cylinder which was at a temperature of —30° C. to a pressure of 600 p.s.i.), 36 mmoles of chlorine nitrate was injected into the cylinder using p.s.i.a. nitrogen. The reaction was allowed to continue for the desired time and the reaction cylinder was then quenched in liquid nitrogen (—196° C.). The reaction products were separated by fractional condensation using cold traps at —95° C. (toluene slush), —126° C. (methylcyclohexane slush), —142° C. (methylcyclopentane slush) and —196° C. (liquid nitrogen). The —95° C. trap contained oxychlorine trifluoride. Both chloryl fluoride and chlorine trifluoride were in the —126° C. fraction. Chlorine was condensed at —142° C. and fluorine nitrate was in the —196° C. fraction. Measurement and identification were made by gas volume measurement, IR spectra and vapor pressure measurements as necessary. Oxychlorine trifluoride has the physical properties shown in Table 1 below. The results of the experiment are shown in Table 2 below.

Examples 2–7

The apparatus and procedure described in Example 1 were used in the fluorination of chlorine nitrate using as the initiator chlorine trifluoride, chlorine monofluoride, chlorine pentafluoride, chloryl fluoride, oxychlorine trifluoride and no initiator, respectively. The results of these experiments are shown in Table 2.

TABLE 1

| | |
|---|---|
| Melting point, ° C. | −41.7±1 |
| Boiling point, ° C. | 29.4±1.0 |
| Molecular weight: | |
| Found (from vapor density measurement) | 105 |
| Calculated | 108.5 |
| Molecular heat of vaporization, Kcal. | 7.7 |
| Trouton constant | 25.4 |
| Density, g./cc. at 25.5° C. | 1.90±0.05 |

TABLE 2

| Example | Initiator | Mole ratio: initiator/ $ClNO_3$ | $F_2$ initial pressure, p.s.i. | Time, minutes to— 20-percent reaction | Time, minutes to— 80-percent reaction | Oxychlorine trifluoride yield, percent of theoretical |
|---|---|---|---|---|---|---|
| 1 | $ClF_3$ | 0.25 | 598 | 7½ | 13 | 70 |
| 2 | $ClF_3$ | 0.10 | 587 | 6½ | 23 | 76 |
| 3 | $ClF$ | 0.31 | 602 | 34 | 69 | 62 |
| 4 | $ClF_5$ | 0.25 | 582 | 57 | 110 | 56 |
| 5 | $FClO_2$ | 0.25 | 562 | 14 | 23 | 69 |
| 6 | $ClF_3O$ | 0.25 | 570 | 4 | 17½ | 59 |
| 7 | None | | 603 | 87 | 116 | 58 |

We claim:

1. In a process for preparing oxychlorine trifluoride by the reaction of chlorine nitrate and fluorine, the improvement comprising initiating the reaction in the presence of a covalent fluoride which is capable of oxidizing chlorine nitrate.

2. The process of claim 1 in which the covalent fluoride is a fluoride of a Group VII–A element, a fluoride of xenon or a fluoride of a Group VI–B, Group VII–B or Group VIII element which is in its maximum valence state.

3. The process of claim 1 in which the covalent fluoride is a covalent oxyfluoride.

4. The process of claim 2 in which the covalent fluoride is xenon difluoride, xenon tetrafluoride or xenon hexafluoride.

5. The process of claim 2 in which the covalent fluoride is a fluoride of a Group VII–A element.

6. The process of claim 5 in which the fluoride is chlorine monofluoride, chlorine trifluoride, oxychlorine trifluoride or chloryl fluoride.

7. The process of claim 2 in which the covalent fluoride is a fluoride of a Group VI–B, Group VII–B or Group VIII element which is in its maximum valence state.

8. The process of claim 7 in which the fluoride is tungsten hexafluoride, osmium octafluoride, platinum hexafluoride or iridium hexafluoride.

9. The process of claim 2 in which the reaction is conducted at a temperature below 100° C.

10. The process of claim 2 in which the reaction is conducted at a temperature from ambient to −23° C.

References Cited

UNITED STATES PATENTS 3,341,295   9/1967   Eibeck et al. _____ 23—203

OTHER REFERENCES

Viers et al.: Chem. Comm., 1967 (21), 1093-4 (England).

CARL D. QUARFORTH, Primary Examiner

E. A. MILLER, Assistant Examiner

U.S. Cl. X.R.

23—367